United States Patent Office 3,194,795
Patented July 13, 1965

3,194,795
PHOSPHORUS ESTERS AND POLYMERS THEREOF
Lester Friedman, Beachwood, Ohio, assignor, by mesne assignments, to Union Carbide Corporation, a corporation of New York
No Drawing. Filed Sept. 7, 1962, Ser. No. 222,217
20 Claims. (Cl. 260—80.3)

The present invention relates to novel phosphorus containing organic compounds.

It is an object of the present invention to prepare novel unsaturated phosphites.

Another object is to prepare novel unsaturated phosphonates.

A further object is to prepare polymers from such novel phosphites and phosphonates.

An additional object is to improve the flame retardant and flame resistant properties of polymers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

As used in the present specification and claims the term "polymer" is generic to homopolymers and copolymers.

It has now been found that these objects can be attained by preparing compounds having the formulae

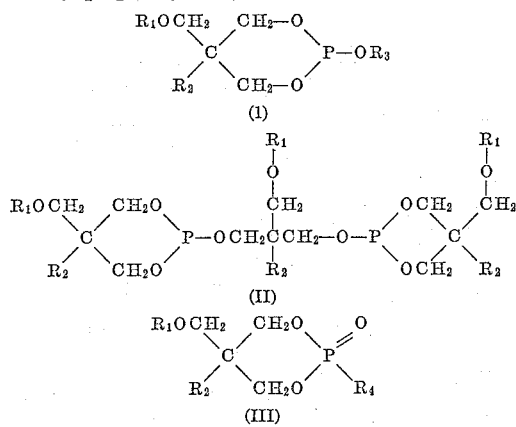

where $R_1$ is selected from the group consisting of allyl, methallyl and crotyl, $R_2$ is an alkyl group, e.g., methyl, ethyl, propyl, butyl or heptadecyl, $R_3$ is hydrogen, alkyl, aryl, haloaryl, alkenyl of 3 to 4 carbon atoms, e.g., allyl, methallyl and crotyl, hydroxyalkyl, hydroxyalkoxyalkyl or hydroxypolyalkoxyalkyl, and $R_4$ is the same as $R_3$ except $R_4$ cannot be hydrogen. $R_1$ is preferably allyl and $R_2$ is preferably ethyl.

The compounds of the present invention can be homopolymerized or they can be copolymerized with other materials such as styrene, p-methyl styrene, α-methyl styrene, acrylates and methacrylates, e.g., methyl methacrylate, butyl methacrylate, methyl acrylate, ethyl acrylate and octyl acrylate, vinyl chloride, vinyl acetate, maleic anhydride, cyclopentadiene, olefins such as ethylene, propylene and butylene, acrylonitrile, vinyl acetate, vinyl propionate, diallyl phthalate, etc.

From 1–99%, preferably 5–90%, of the copolymer is the novel phosphorus compound and the balance is the copolymerizable material. Terpolymers can also be prepared. Additionally, the novel phosphorus compounds can be interpolymerized with each other.

The polymers of the present invention have all the normal uses of polymers, e.g., they can be molded into cups or plates or can be made into protective films for covering metal, wood, glass, etc. Additionally, the homopolymers are nonburning and the copolymers have increased resistance to fire and flame than conventional polymers of ethylenically unsaturated hydrocarbons such as styrene, ethylene and propylene, for example.

The polymers produced are quite tough and when more than one ethylenically unsaturated group is present on the phosphorus compound, they are cross-linked and infusible in their final form.

The polymerization is carried out in the presence of 0.1–10% of conventional polymerization catalysts such as peroxides, e.g., benzoyl peroxide, di t. butyl peroxide, p-chlorobenzoyl peroxide, methyl ethyl ketone peroxide, cumene hydroperoxide, acetyl peroxide, dicumyl peroxide, persulfates, e.g., potassium persulfate and ammonium persulfate, sodium perborate, sodium percarbonate, azo compounds of the type described in Hunt U.S. Patent 2,471,959, e.g., azo-bis-isobutyronitrile.

Polymerization can be carried out in emulsion, solution or in bulk using conventional techniques.

The novel phosphorus containing monomers also are useful for reaction with bromine to give brominated products. When $R_3$ is hydroxyalkyl, hydroxyalkoxyalkyl or hydroxypolyalkoxyalkyl and bromine is added across the double bond or double bonds of the allyl group or groups, the resulting product can be incorporated into urethane forming materials and polyester forming materials to make them flame retardant.

The phosphite monomers are useful as stabilizers for vinyl chloride resins, polyethylene and polypropylene, e.g., when used in an amount of 0.1–10%.

Examples of compounds within the present invention include trimethylolpropane monoallyl ether phenyl phosphite (also called 5-allyloxymethyl-5-ethyl-2-phenoxy-1, 3,2-dioxaphosphorinane), trimethylolethane monoallyl ether phenyl phosphite, trimethylolbutane monoallyl ether phenyl phosphite, trimethylolheptadecane monoallyl ether phenyl phosphite, trimethylolpropane monomethallyl ether phenyl phosphite, trimethylolpropane monocrotyl ether phenyl phosphite, trimethylolpropane monoallyl ether o-cresyl phosphite, trimethylolpropane monoallyl ether p-octylphenyl phosphite, trimethylolpropane monoallyl ether m-chlorophenyl phosphite, trimethylolpropane monoallyl ether α-naphthyl phosphite, trimethylolpropane monoallyl ether decyl phosphite, trimethylolpropane monoallyl ether octadecyl phosphite, trimethylolpropane monoallyl ether methyl phosphite, trimethylolethane monoallyl ether decyl phosphite, trimethylolethane monoallyl ether allyl phosphite, trimethylolpropane monoallyl ether allyl phosphite, trimethylolpropane monoallyl ether methallyl phosphite, trimethylolpropane monocrotyl ether crotyl phosphite, trimethylolpropane monoallyl ether hydroxyethyl phosphite, trimethylolpropane monoallyl ether hydroxypropyl phosphite, trimethylolethane monoallyl ether hydroxypropoxypropyl phosphite, trimethylolpropane monoallyl ether hydroxyethoxyethyl phosphite, trimethylolpropane monoallyl ether hydroxypropoxypropyl phosphite, trimethylolpropane monoallyl ether hydroxypolypropoxypropyl phosphite (where the polypropoxy group has a molecular weight of 2000), trimethylolpropane monoallyl ether hydrogen phosphite, trimethylolethane monoallyl ether hydrogen phosphite, tris (trimethylolpropane monoallyl ether) diphosphite, tris (trimethylolpropane monomethallyl ether) diphosphite, tris (trimethylolpropane monocrotyl ether) diphosphite, tris (trimethylolethane monoallyl ether) diphosphite, tris (trimethylolbutane monoallyl ether) diphosphite, tris (trimethylolethane monomethallyl ether) diphosphite, trimethylolpropane monoallyl ether benzene phosphonate (also called 5-allyloxymethyl-5-ethyl-phenyl - 1,3,2 - phosphorinone), trimethylolethane monoallyl ether benzene phosphonate, trimethylolbutane monoallyl ether phenyl phosphonate, trimethylolheptadecane monoallyl ether benzene phosphonate, trimethylolpropane monomethallyl ether benzene phosphonate, trimethylolpropane monocrotyl ether benzene phosphonate, trimethylolpropane monoallyl ether p-methylbenzene phosphonate, trimethylolpropane monoallyl ether m-octyl benzene phosphonate, trimethylolpropane monoallyl ether m-chlorobenzene phosphonate, trimethylolpropane monoallyl ether β-naphthalene phosphonate, trimethylolpropane monoallyl ether decane phosphonate, trimethylolpropane monoallyl ether octadecane phosphonate, trimethylolpropane monoallyl ether methane phosphonate, trimethylolethane monoallyl ether decane phosphonate, trimethylolethane monoallyl ether propene phosphonate, trimethylolpropane monoallyl ether propene phosphonate, trimethylolpropane monomethallyl ether 2-methylpropene phosphonate, trimethylolpropane monoallyl ether hydroxyethane phosphonate, trimethylolpropane monoallyl ether 2-hydroxy-2-methylethane phosphonate, trimethylolpropane monoallyl ether 2-hydroxy-2-methylethoxy-2'-methylethane phosphonate, trimethylolpropane monoallyl ether 2-hydroxypolypropoxypropane phosphonate (where the propoxy groups are primarily 2-methylethoxy groups and there are 34 propoxy groups), trimethylolpropane monoallyl ether hydroxypolyethoxyethane phosphonate (where the polyethoxy group has 20 units).

The compounds within Formula I wherein $R_3$ is aryl or haloaryl are prepared by reacting one mole of the appropriate 2 - alkyl-2-alkenyloxymethyl-1,3-propanediol with one mole of triaryl phosphite or one mole of trihaloaryl phosphite, e.g., triphenyl phosphite, tri-o-cresyl phosphite, tri-p-cresyl phosphite, tri xylenyl phosphite, tri-α-naphthyl phosphite, tri octylphenyl phosphite, tri-m-chlorophenyl phosphite, tri-p-bromophenyl phosphite. The reaction is preferably catalyzed by the use of 0.1–2% of a dialkyl or diaryl or dihaloaryl phosphite such as diphenyl phosphite, di-o-cresyl phosphite, di-p-cresyl phosphite, di xylenyl phosphite, di-α-naphthyl phosphite, dimethyl phosphite, di decyl phosphite, di octadecyl phosphite, phenyl decyl phosphite, di-p-chlorophenyl phosphite. Alternatively, there can be used 0.1–2% of an alkaline catalyst such as sodium phenolate, sodium methylate, sodium decylate, potassium phenolate, sodium dipropylene glycolate or the like. The alkaline catalyst preferably has a pH of at least 11 in an 0.1 N solution.

The compounds within Formula I wherein $R_3$ is alkyl can be made in the same manner as those compounds where $R_3$ is aryl or haloaryl by replacing the triaryl or trihaloaryl phosphite with one mole of a trialkyl phosphite, e.g., tris decyl phosphite, tri octadecyl phosphite or a mixed diaryl alkyl phosphite, e.g., diphenyl decyl phosphite. Alternatively, the compounds of Formula I when $R_3$ is alkyl can be prepared by transesterifying the compounds of Formula I where $R_3$ is aryl or haloaryl with an equimolar amount of an alkanol, e.g., decanol, octanol, octadecanol, methanol, utilizing as a catalyst the dihydrocarbon or dihaloaryl phosphites in the amounts set forth above or using the alkaline catalysts referred to above.

The compounds of Formula I when $R_3$ is alkenyl can be prepared by reacting one mole of the compounds of Formula I when $R_3$ is aryl or haloaryl with an excess, e.g., 1.5–5 moles, of the appropriate alkenol in the presence of sufficient alkali metal hydroxide, e.g., sodium hydroxide or potassium hydroxide, to neutralize the phenol formed.

The compounds within Formula I where $R_3$ is hydroxyalkyl, hydroxyalkoxyalkyl or hydroxypolyalkoxyalkyl can be prepared from the compounds of Formula I where $R_3$ is aryl or haloaryl in the same manner as the compounds where $R_3$ is alkyl but utilizing a glycol or polyalkylene glycol such as ethylene glycol, propylene glycol, diethylene glycol, dipropylene glycol, polypropylene glycol (molecular weight 2025), or polyethylene glycol (molecular weight 1000) in place of the alkanol.

The compounds within Formula I where R is hydrogen are prepared by acid hydrolyzing the compounds of Formula I where R is aryl or haloaryl.

The compounds within Formula II are prepared by reacting 1.5 moles of the appropriate 2-alkyl-2-alkenyloxymethyl-1,3-propanediol with one mole of triaryl phosphite or trihaloaryl phosphite in the presence of 0.1–2% of a diaryl phosphite or dialkyl phosphite or alkaline catalyst as set forth above.

The compounds of Formula III are prepared by Arbuzov rearrangement of the compounds of Formula I when $R_3$ is other than hydrogen. Thus, rearrangement can be carried out using 0.1–5% of an alkyl or alkenyl halide such as allyl bromide, butyl bromide, amyl chloride or a halohydrin such as propylene chlorhydrin, propylene bromohydrin.

Unless otherwise indicated, all parts and percentages are by weight.

*Example 1*

Trimethylolpropane monoallyl ether (2-ethyl-2-allyl-oxymethyl-1,3-propanediol) in an amount of 174 grams (1 mole) and 310 grams of triphenyl phosphite (1 mole) were heated with 2 grams of diphenyl phosphite as a catalyst in vacuo with stirring at 115–125° C. at 10 mm. The phenol formed in the tranesterification was removed as formed by overhead distillation. The final removal of phenol was facilitated by use of a nitrogen stream and elevation of the reaction temperature to 160° C. The residue in an amount of 280 grams was trimethylolpropane monoallyl ether phenyl phosphite, a liquid distilling at 110–125° C./0.5 mm. and having the formula

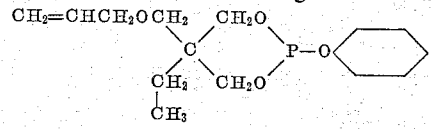

*Example 2*

The procedure of Example 1 was repeated replacing the trimethylolpropane monoallyl ether with one mole of trimethylolpropane monomethallyl ether to produce trimethylolpropane monomethallyl phenyl phosphite as the residue in the pot.

*Example 3*

The procedure of Example 1 was repeated replacing the trimethylolpropane monoallyl ether with one mole of trimethylolethane monoallylether and replacing the triphenyl phosphite with one mole of tri-p-cresyl phosphite to produce trimethylolethane monoallyl ether p-cresyl phosphite as the residue in the pot.

*Example 4*

Trimethylolpropane monoallyl ether in an amount of 261 grams (1.5 moles) and 310 grams (1 mole) of triphenyl phosphite were transesterified with the aid of 2 grams of diphenyl phosphite catalyst using the technique of Example 1. The residue in the pot after removal of the phenol formed was essentially pure tris (trimethylolpropane monoallyl ether) diphosphite of the formula

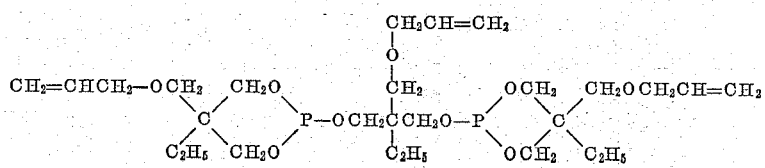

Example 5

The procedure of Example 4 was repeated replacing the trimethylolpropane monoallyl ether with 1.5 moles of trimethylolpropane monomethallyl ether to produce tris (trimethylolpropane monomethallyl ether) diphosphite as the residue in the pot.

Example 6

The procedure of Example 4 was repeated using 1.5 moles of trimethylolethane monoallyl ether to produce tris (trimethylolethane monoallyl ether) diphosphite as the residue.

Example 7

The trimethylolpropane monoallyl ether phenyl phosphite in an amount of 148 grams (0.5 mole) was hydrolyzed at 50–80° C. wth 9 grams of water containing one drop of concentrated hydrochloric acid. The phenol formed by the hydrolysis was removed by distillation in vacuo and amounted to 45 grams. The residual viscous liquid distilled at 120–125° C./3 mm., was essentially pure bis (trimethylolpropane monoallyl ether) hydrogen phosphite and had the formula

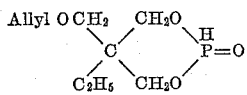

Example 8

5 grams of the product of Example 7 was heated with 2 drops of di-t-butyl peroxide in a test tube at 135° C. overnight. Polymerization resulted to give a clear tough, almost colorless resin that was nonflammable. Infrared spectra indicated a polyphosphonate structure.

Example 9

A mixture of 296 grams of trimethylolpropane monoallyl ether phenyl phosphite (1 mole) and 180 grams of allyl alcohol (3 moles) were cooled to 20° C. and 41 grams of powdered sodium hydroxide added in portions. When addition was complete (15 minutes), the mixture was treated with 500 ml. of ice water. The product was separated from the lower aqueous layer, dried over potassium carbonate and stripped of volatile products at 90° C./10 mm. The trimethylolpropane monoallyl ether allyl phosphite residue had the formula

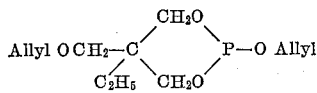

It was stored over 0.1% hydroquinone to prevent polymerization.

Example 10

5 parts of trimethylolpropane monoallyl ether allyl phosphite were heated with 95 parts of styrene in the presence of one part of benzoyl peroxide to form a solid copolymer.

Similarly, solid copolymers were prepared from (a) 95 parts of trimethylolpropane monoallyl ether allyl phosphite and 5 parts of methyl methacrylate in the presence of 1% benzoyl peroxide and (b) 50 parts of trimethylolpropane monoallyl ether allyl phosphite and 50 parts of ethyl acrylate in the presence of 1% cumene hydroperoxide.

Example 11

100 parts of the product of Example 1 were heated with 2 parts of butyl bromide at 135° C. to form trimethylolpropane monoallyl ether benzene phosphonate, a liquid having the formula

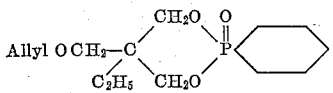

This product was converted to a polymer by heating with 2% of benzoyl peroxide.

Example 12

100 parts of trimethylolpropane monoallyl ether allyl phosphite was heated with 5 parts of allyl bromide at 120° C. to form trimethylolpropane monoallyl ether propene phosphonate having the formula

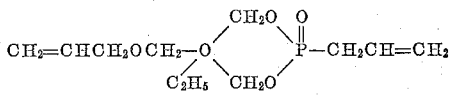

Example 13

148 grams (0.5 mole) of trimethylolpropane monoallyl ether phenyl phosphite was heated with 0.5 mole of decyl alcohol in the presence of 3 grams of diphenyl phosphite catalyst to give, after removal of the phenol formed, trimethylolpropane monoallyl ether decyl phosphite as a clear, colorless liquid residue.

Example 14

The procedure of Example 13 was repeated replacing the decyl alcohol with 0.5 mole of ethylene glycol to produce trimethylolpropane monoallyl ether hydroxyethyl phosphite as the liquid residue.

Example 15

The procedure of Example 13 was repeated replacing the decyl alcohol with 0.5 mole of dipropylene glycol to produce trimethylolpropane monoallyl ether hydroxypropoxypropyl phosphite as the liquid residue.

Example 16

The product of Example 13 was converted to trimethylolpropane monoallyl ether decane phosphonate by heating at 135° C. with 45% of amyl bromide.

Example 17

The product of Example 14 was converted to trimethylolpropane monoallyl ether hydroxyethane phosphate by heating at 135° C. with 5% ethylene bromohydrin.

Example 18

The product of Example 15 was converted to trimethylolpropane monoallyl ether hydroxypropoxy propane phosphonate by heating to 120° C. with 5% of amyl bromide.

Example 19

50 parts of the product of Example 13 was copolymerized with 50 parts of styrene in the presence of 1% of azo bis-isobutyronitrile to give a copolymer which was less brittle than a control homopolymer of styrene.

There are also embraced within the present invention phosphites and phosphonates within the following formulae, as well as their polymers.

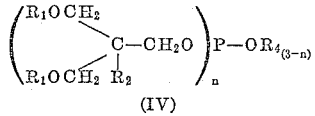

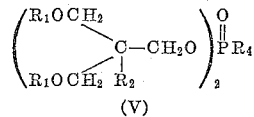

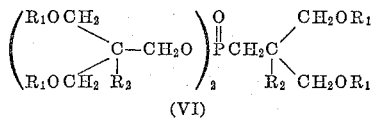

where $R_1$, $R_2$ and $R_3$ are as defined above and $n$ is 2 or 3. These compounds have the same uses as the phosphites and phosphonates previously set forth. Typical examples of compounds within Formulae IV, V and VI are tris (trimethyloypropane diallyl ether) phosphite, tris (trimethylolethane diallyl ether) phosphite, tris (trimethylolpropane dimethallyl ether) phosphite, tris (trimethylolpropane diallyl ether) phosphonate, tris (trimethylolethane diallyl ether) phosphonate, bis (trimethylolpropane diallyl ether) decyl phosphite, bis (trimethylolpropane diallyl ether) phenyl phosphite, bis (trimethylolpropane diallyl ether) decane phosphonate, bis (trimethylolpropane diallyl ether) benzene phosphonate.

These compounds can be formed in the manner indicated by the following examples.

*Example 20*

214 grams (1 mole) of trimethylolpropane diallyl ether and 104 grams (0.33 mole) of triphenyl phosphite were reacted in accordance with the procedure of Example 1 in the presence of 2 grams of diphenyl phosphite catalyst. After removal of the phenol (92 grams) by distillation, the residue in the pot was essentially pure tris (trimethylolpropane diallyl ether) phosphite.

*Example 21*

The product of Example 20 was polymerized in the presence of ultra-violet light to give a hard, tough, colorless, clear nonburning plastic.

Another portion of the product of Example 21 was copolymerized with 20% of styrene in the presence of 1% benzoyl peroxide to give a tough copolymer.

*Example 22*

The product of Example 20 was converted to tris (trimethylolpropane diallyl ether) phosphonate by heating at 120° C. with 5% of amyl bromide.

*Example 23*

143 grams of trimethyloypropane diallyl ether (0.67 mole), 104 grams (0.33 mole) of triphenyl phosphite and 53 grams (0.33 mole) of decyl alcohol were heated together in the presence of 2 grams of diphenyl phosphite using the procedure of Example 1 to obtain bis (trimethylolpropane diallyl ether) decyl phosphite as the residue in the pot.

*Example 24*

The product of Example 23 was rearranged to bis (trimethylolpropane diallyl ether) decane phosphonate by heating at 120° C. with 4% amyl bromide.

*Example 25*

Bis (trimethylolpropane diallyl ether) phenyl phosphite was obtained by following the procedure of Example 23 omitting the decyl alcohol.

I claim:
1. A monomer of the group consisting of

(a) 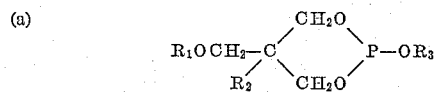

(b) 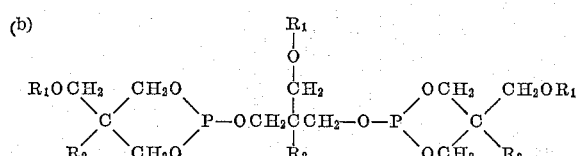

(c) 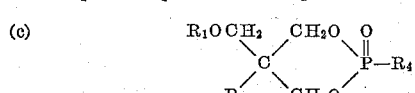

(d) 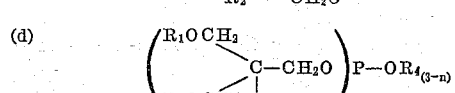

(e) 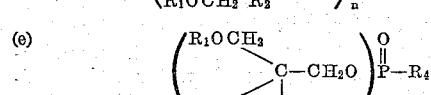

(f) 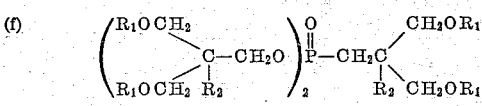

where $R_1$ is selected from the group consisting of allyl, methallyl and crotyl, $R_2$ is alkyl, $R_3$ is selected from the group consisting of hydrogen, alkyl, aryl, haloaryl, alkenyl of 3 to 4 carbon atoms, hydroxyalkyl, hydroxyalkoxyalkyl and hydroxypolyalkoxyalkyl, $R_4$ is selected from the group consisting of alkyl, aryl, haloaryl, alkenyl of 3 to 4 carbon atoms, hydroxyalkyl, hydroxyalkoxyalkyl and hydroxypolyalkoxyalkyl, $n$ is an integer from 2 to 3.

2.

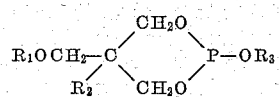

where $R_1$ is allyl, $R_2$ is alkyl and $R_3$ is aryl.

3.

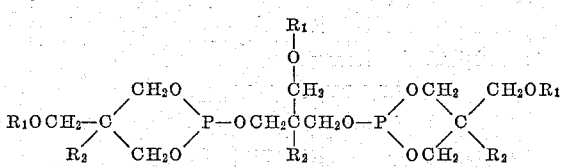

where $R_1$ is allyl and $R_2$ is alkyl.

4. A compound according to claim 3 wherein $R_2$ has 1 to 2 carbon atoms.

5.

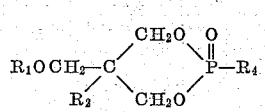

where $R_1$ is allyl, $R_2$ is alkyl and $R_4$ is aryl.

6.

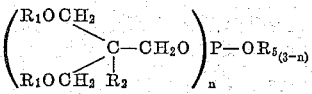

where $R_1$ is allyl, $R_2$ is alkyl and $R_5$ is aryl and $n$ is an integer from 2 to 3.

7. A product according to claim 6 wherein $n$ is 2.
8. A product according to claim 6 wherein $n$ is 3.
9. Trimethylolpropane monoallyl ether aryl phosphites where the aryl group is of the benzene series.
10. Trimethylolpropane monoallyl ether phenyl phosphite.
11. Trimethylolpropane monoallyl ether alkyl phosphites.
12. Trimethylolpropane monoallyl ether hydrogen phosphite.
13. Trimethylolpropane monoallyl ether allyl phosphite.
14. Trimethylolpropane monoallyl ether decyl phosphite.
15. Tris (trimethylolpropane diallyl ether) phosphite.
16. Bis (trimethylolpropane diallyl ether) alkyl phosphite.
17. Bis (trimethylolpropane diallyl ether) aryl phosphite.
18. A polymer of a monomer of the group consisting of (a) 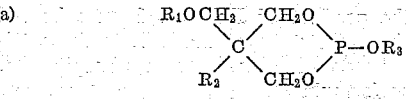

(b) 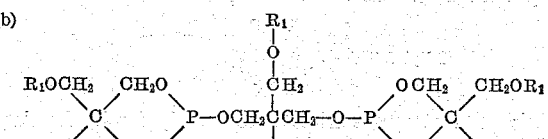

(c) 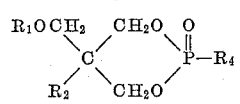

(d) 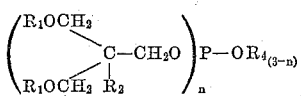

(e) 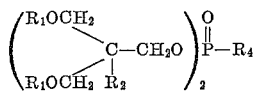

(f) 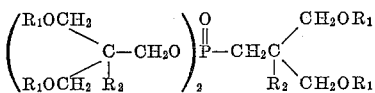

where $R_1$ is selected from the group consisting of allyl, methallyl and crotyl, $R_2$ is alkyl, $R_3$ is selected from the group consisting of hydrogen, alkyl, aryl, haloaryl, alkenyl of 3 to 4 carbon atoms, hydroxyalkyl, hydroxyalkoxyalkyl and hydroxypolyalkoxyalkyl, $R_4$ is selected from the group consisting of alkyl, aryl, haloaryl, alkenyl of 3 to 4 carbon atoms, hydroxyalkyl, hydroxyalkoxyalkyl and hydroxypolyalkoxyalkyl, $n$ is an integer from 2 to 3.

19. A copolymer of a monomer set forth in claim 18 with a copolymerizable ethylenically unsaturated compound.

20. A copolymer according to claim 19 wherein from 1 to 99% of the copolymer is made from said monomer.

References Cited by the Examiner
UNITED STATES PATENTS 2,728,789  12/55  Morris et al. _____ 260—88.3
2,834,798  5/58   Hechenbleikner et al. __ 260—461

JOSEPH L. SCHOFER, *Primary Examiner.*
WILLIAM H. SHORT, *Examiner.*